(12) United States Patent
Oates

(10) Patent No.: US 6,200,240 B1
(45) Date of Patent: Mar. 13, 2001

(54) INTER-AXLE DIFFERENTIAL ASSEMBLY FOR A TANDEM DRIVE AXLE SET

(75) Inventor: Jack Darrin Oates, Fletcher, NC (US)

(73) Assignee: Meritor Heavy Vehicle Systems, LLC

( * ) Notice: Subject to any disclaimer, the term of this patent is extended or adjusted under 35 U.S.C. 154(b) by 0 days.

(21) Appl. No.: 09/248,411

(22) Filed: Feb. 11, 1999

(51) Int. Cl.[7] .................................................. F16H 48/06
(52) U.S. Cl. ............................................................ 475/221
(58) Field of Search ..................................... 475/221, 222

(56) References Cited

U.S. PATENT DOCUMENTS

| Re. 25,269 | * | 10/1962 | Christie | 475/221 |
| 4,050,534 | * | 9/1977 | Nelson et al. | 475/221 |
| 5,860,889 | * | 1/1999 | Schlosser et al. | 475/221 |

\* cited by examiner

*Primary Examiner*—Dirk Wright
(74) *Attorney, Agent, or Firm*—Carlson, Gaskey & Olds

(57) ABSTRACT

An inter-axle differential assembly for a tandem drive axle set is disclosed that permits a rear drive assembly and a forward drive assembly to have the same input axis. The forward drive assembly includes a hollow pinion gear. An inter-axle differential assembly receives input from a driveline connection and transfers this input to the hollow pinion gear and to a through shaft that extends through the hollow pinion gear. The hollow pinion gear drives a main differential assembly that in turn drives a forward axle. The through shaft extends toward a rear drive assembly and provides input to the rear drive assembly. The rear drive assembly utilizes a rear pinion gear to drive a rear differential. The rear differential in turn drives a rear axle. Thus, the present design permits a common axis to be shared by the input to the forward drive assembly and the input to the rear drive assembly. In addition, the present design eliminates the traditionally required helical gears from the forward drive assembly.

10 Claims, 3 Drawing Sheets

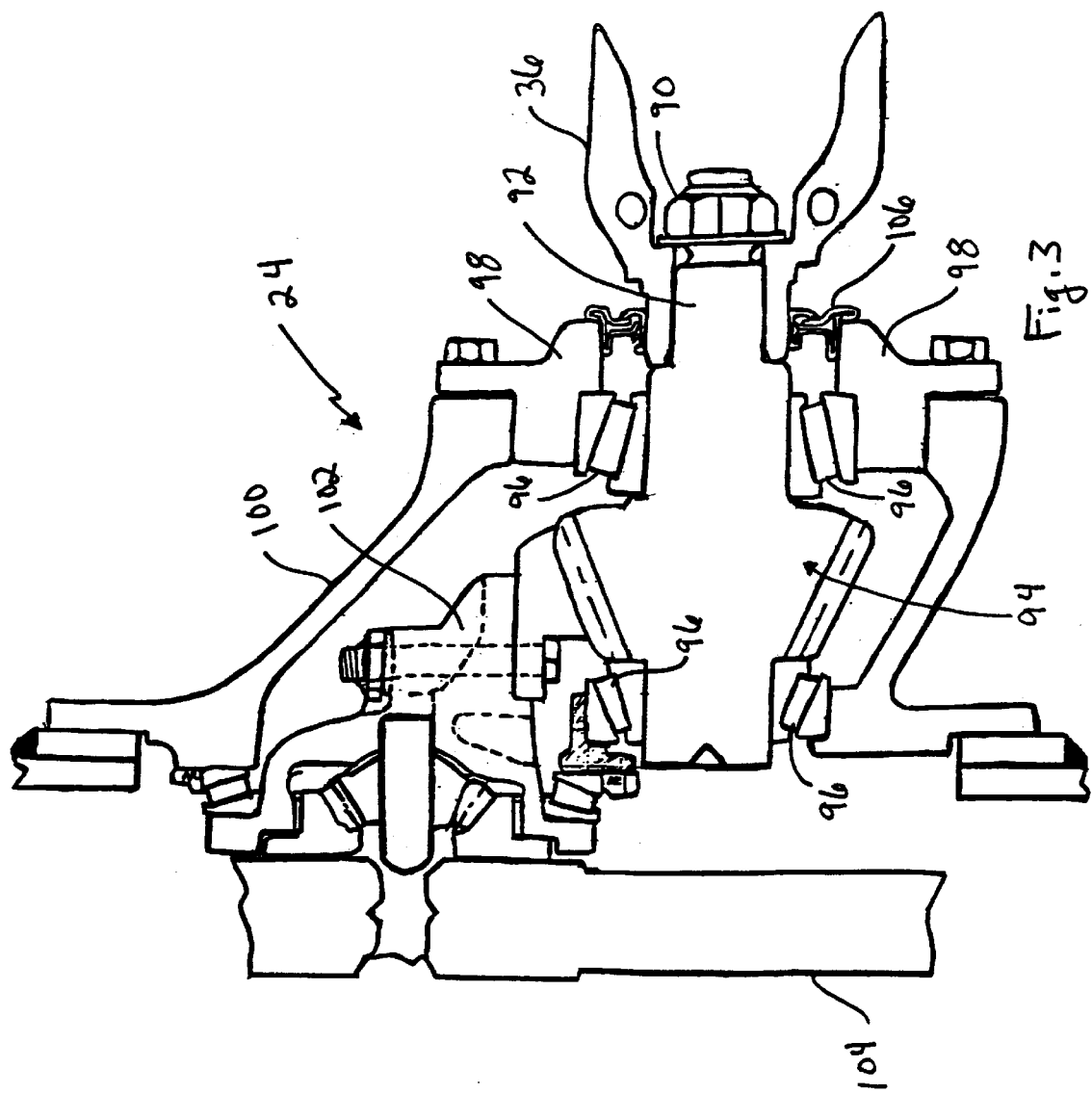

INTER-AXLE DIFFERENTIAL ASSEMBLY FOR A TANDEM DRIVE AXLE SET

BACKGROUND OF THE INVENTION

This invention relates generally to tandem drive axle sets and, more particularly, to an inter-axle differential assembly for a tandem drive axle set.

A tandem drive axle set is used to distribute rotational power from a driveline input to a set of forward and rear wheels through a forward drive assembly and a rear drive assembly, respectively. Traditionally, the tandem drive axle set is designed such that the forward drive assembly has a ring gear and a pinion gear set that is a mirror image of the rear drive assembly ring gear and pinion gear set. Usually, the forward drive assembly has a right-hand pinion gear while the rear drive assembly has a left-hand pinion gear. It is necessary that the forward and rear drive assemblies be mirror images of each other because, traditionally, the forward drive assembly has included a set of helical gears that are used to transfer half of the rotational power from an inter-axle differential to the forward drive assembly pinion and ring gear set. That is, the forward and rear drives require distinct parts, which requires increased inventory.

The inter-axle differential receives rotational input from the driveline of the vehicle. In such a design, the pinion gear of the forward drive assembly rotates in the opposite direction to that of the inter-axle differential. The inter-axle differential transmits the other half of its input to a through shaft which sends the input back to the rear drive assembly. In the rear drive assembly the pinion gear rotates in the same direction as the inter-axle differential. Because the helical gears are necessary in the forward drive assembly, the axis of the input to the forward drive assembly is offset from the pinion gear axis in the forward drive assembly by the centerline-to-centerline distance of the helical gears. Therefore, the output of the forward axle is on the same axis as the input while the input of the rear drive assembly is on the same axis as the forward axle drive pinion gear.

This difference in axis height between the forward axle output to the rear axle input requires different axle pinion angles to be utilized in order to set the driveline angles in the u-joints used in the driveline. Setting and maintaining the driveline angles is difficult. When the driveline angles at the u-joints are not the same it creates adverse torsional loading and vibrations in the drivetrain assembly. Such torsional loading and vibrations can lead to premature failure of the drivetrain assembly. Even when the driveline angles are properly set at the factory, the air-ride suspensions commonly found in heavy duty trucks can alter the driveline working angles in an adverse manner.

Therefore, it is desirable to provide a tandem axle drive set wherein the input power to the forward drive assembly is set on the same axis as the input power to the rear drive assembly. This eliminates the need to set driveline angles and to provide distinct drive components.

SUMMARY OF THE INVENTION

In general terms, this invention provides a tandem axle drive set wherein the input power axis to the forward drive assembly of the tandem axle drive set is on the same axis as the input power axis to the rear drive assembly. In addition, the present design eliminates the traditional need for a set of helical gears in the forward drive assembly and permits commonality of design for many components in both the forward and rear drive assemblies of the tandem drive axle set.

Preferably, the tandem axle drive set comprises a forward drive assembly including an inter-axle differential having a pair of outer side gears, a main differential, and a hollow pinion gear. A through shaft has a first end secured to one of the outer side gears and extends through the hollow pinion gear toward a rear drive assembly. The rear drive assembly includes a rear pinion gear and a rear differential. The through shaft drives the rear pinion gear. Rotation of the inter-axle differential rotates the through shaft, the hollow pinion gear, and the rear pinion gear. The hollow pinion gear drives the main differential and the rear pinion gear drives the rear differential.

Thus, a tandem drive axle set is provided wherein the input to the forward drive assembly is on the same axis as the input to the rear drive assembly. This design eliminates the need for setting driveline angles between the forward and rear drive assemblies.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 3 is a cross-sectional top view of a rear drive assembly designed in accordance with the present invention.

DETAILED DESCRIPTION OF THE PREFERRED EMBODIMENT

Figure 1:
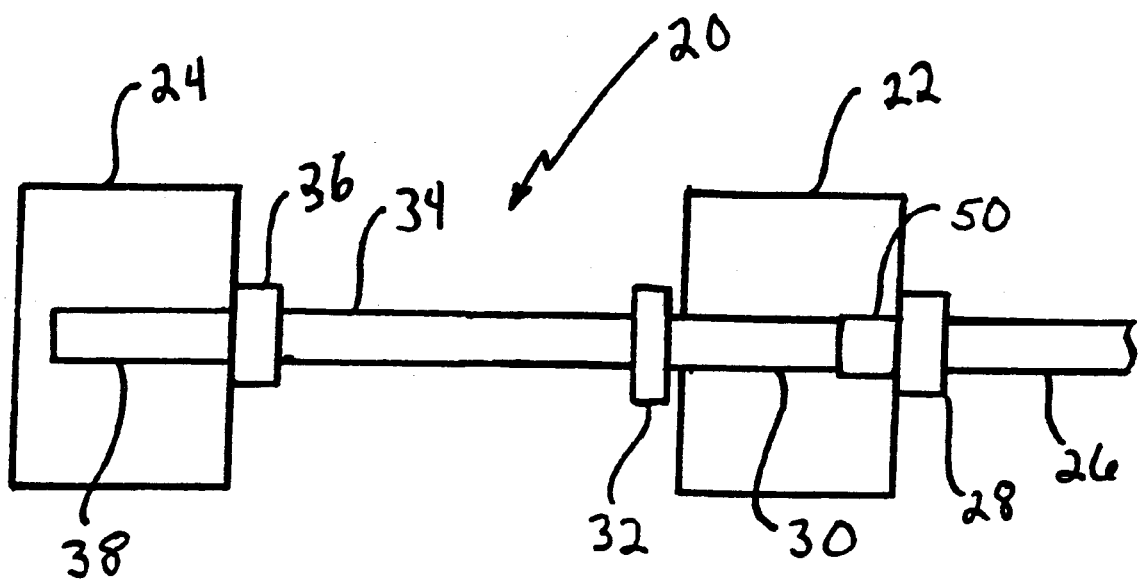
FIG. 1 is a schematic drawing of a driveline designed in accordance with the present invention.

A tandem drive axle set is generally indicated at 20 in FIG. 1. Tandem drive axle set 20 includes a forward drive assembly 22 and a rear drive assembly 24. An driveline connection 26 provides rotational power input to forward drive assembly 22 through a yoke 28. An inter-axle differential assembly 50 receives power from yoke 28 and transfers it to forward drive assembly 22. A through shaft 30 transfers power from forward drive assembly 22 to rear drive assembly 24. A yoke 32 connects through shaft 30 to a driveline connection 34 that is then connected to rear drive assembly 24 through a yoke 36. An input 38 provides power to rear drive assembly 24 from driveline connection 34. Notably, inter-axle differential assembly 50 and shafts 30, 34 and 38 are coaxial. This design is contrary to the prior art wherein there was not a single axis for the drive. The use of this single axis eliminates many concerns forced by the prior art. Further, the single axis allows the use of common front and rear drive assembly components. As known by one of ordinary skill in the art, the inter-axle differential assembly shown at 50 combines the prior art use of a separate input shaft and inter-axle differential assembly.

Figure 2:
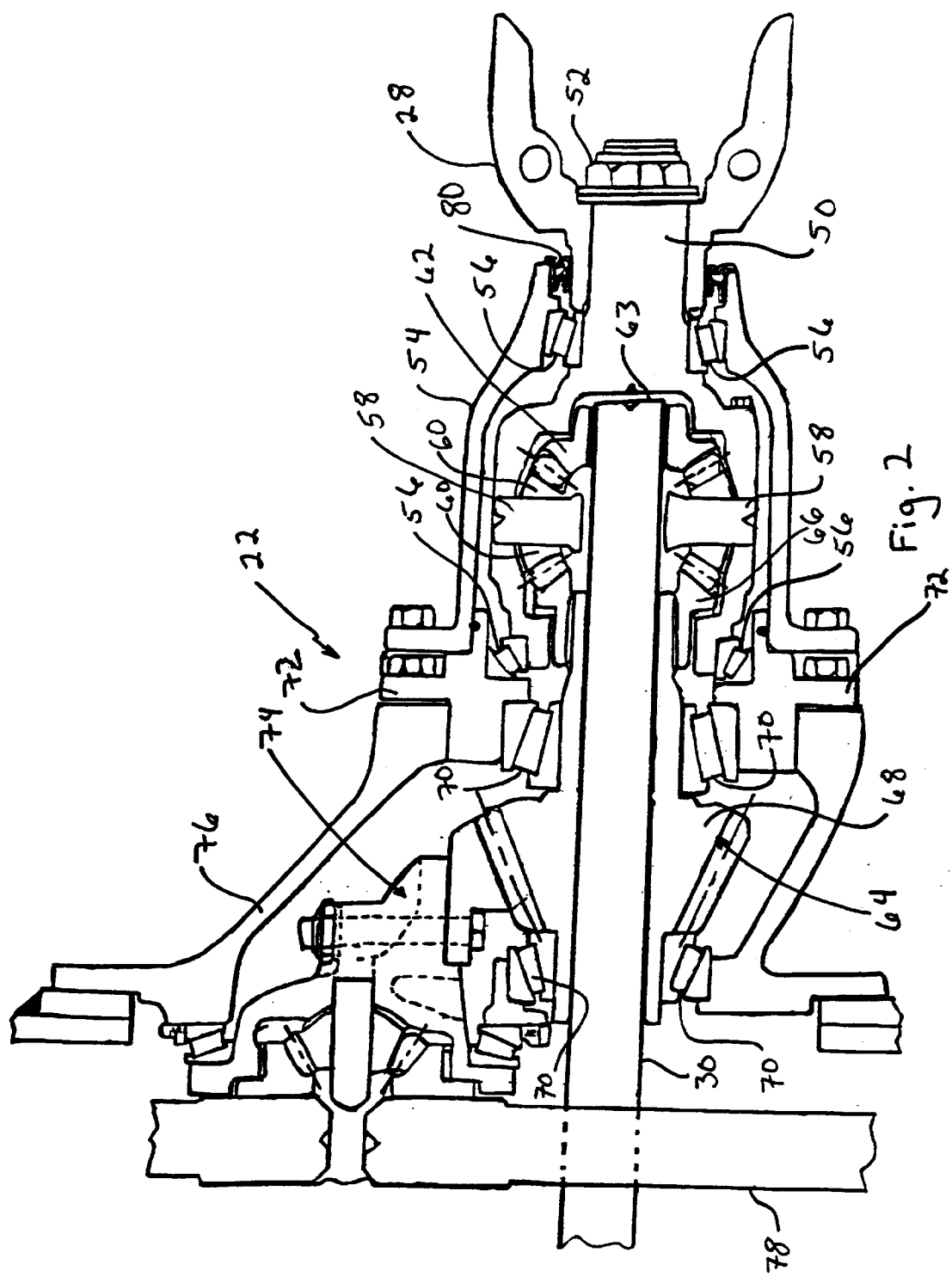
FIG. 2 is a cross-sectional top view of a forward drive assembly designed in accordance with the present invention.

In FIG. 2 a cross-sectional top view of forward drive assembly 22 is shown. Forward drive assembly 22 includes an inter-axle differential assembly 50 that is fastened to yoke 28 through a fastener 52. Yoke 28 receives rotational input from driveline connection 26. Inter-axle differential assembly 50 is surrounded by an inter-axle differential cover 54. Inter-axle differential assembly 50 is supported within cover 54 by a plurality of roller bearings 56. Preferably, roller bearings 56 are tapered roller bearings as shown. Rotation of driveline connection 26 is transferred to inter-axle differential assembly 50 through yoke 28. Inter-axle differential assembly 50 in turn rotates a plurality of spider shafts 58 that rotate a series of spider gears 60. Spider gears 60 rotate a pair of inter-axle differential outer side gears 62 and 66.

Through shaft 30 includes a first end 63 that is secured to the inter-axle differential outer side gear 62. Through shaft 30 extends from inter-axle differential outer side gear 62 through a hollow pinion gear 64. Hollow pinion gear 64 includes a pinion gear head 68 and is rotated by the other outer side gear 66. Shaft 30 is not fixed to rotate with outer side gear 66 and gear 64. Outer side gear 66 and gear 64 are fixed to rotate together. Shaft 30, gear 64 and gear 66 do tend to all rotate at the same speed. A plurality of roller bearings 70 support hollow pinion gear 64 within a main differential cover 76. Preferably, roller bearings 70 are tapered roller bearings as shown. A pinion cage 72 is used to position a portion of the tapered roller bearings 70. Hollow pinion gear 64 drives a main differential assembly 74. The main differential assembly 74 is well known in the art and does not form a novel portion of the present invention.

A forward axle 78 is driven by main differential assembly 74. Through shaft 30 extends beyond forward axle 78 and passes closely adjacent either above or below forward axle 78. A seal 80 is utilized to seal one end of inter-axle differential cover 54 to yoke 28. As would be understood by one of ordinary skill in the art, forward axle 78 may be located either below or above through shaft 30.

As shown in FIG. 2, through shaft 30 and hollow pinion gear 64 are on the same axis as the input to through shaft 30 from inter-axle differential assembly 50.

In FIG. 3, a cross-sectional top view of rear drive assembly 24 is shown. Rear drive assembly 24 includes a rear pinion gear 94 having an input end 92 that is secured via a fastener 90 to yoke 36. Yoke 36 receives rotational input from driveline connection 34. As mentioned above, input end 92 is on the same axis as through shaft 30. A plurality of roller bearings 96 and a pinion cage 98 support rear pinion gear 94 within a rear differential cover 100. Preferably, roller bearings 96 are tapered roller bearings as shown. Rotation of rear pinion gear 94 drives a rear differential 102. The design of rear differential 102 is well known in the art. A rear axle 104 is driven by rear differential 102. A seal 106 seals a gap between pinion cage 98 and yoke 36. Preferably, seal 106 and seal 80 comprise annular seals as are known in the art.

As shown in FIGS. 1–3, the present design permits a common axis to be shared by inter-axle differential assembly 50, through shaft 30, hollow pinion gear 64, and rear pinion gear 94. Thus, the present design eliminates the need to adjust driveline angles between yokes on the ends of any of the inputs or outputs to the tandem drive axle set 20. In addition, the present design enables the elimination of the traditional helical gear set in the forward drive assembly 22. As can be seen in the Figures, the present design permits a number of commonly designed elements to be used in both the forward drive assembly 22 and the rear drive assembly 24.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A tandem axle drive set comprising:

a forward drive assembly including an inter-axle differential having a pair of outer side gears, a main differential, and a hollow pinion gear;

a through shaft having a first end secured to one of said outer side gears and extending through said hollow pinion gear, said through shaft not rotating with said hollow pinion gear;

a rear drive assembly including a rear pinion gear and a rear differential, said through shaft driving said rear pinion gear; and rotation of said inter-axle differential rotating said through shaft, said hollow pinion gear, and said rear pinion gear, with said hollow pinion gear driving said main differential and said rear pinion gear driving said rear differential.

2. A tandem axle drive set as recited in claim 1, wherein said hollow pinion gear is supported by at least one pair of roller bearings.

3. A tandem axle drive set as recited in claim 2 wherein said roller bearings comprise tapered roller bearings.

4. A tandem axle drive set as recited in claim 1 wherein said hollow pinion gear, said through shaft and said rear pinion gear all rotate about the same axis.

5. A tandem axle drive set as recited in claim 1 wherein said rear drive assembly and said forward drive assembly each include at least one annular seal.

6. A tandem axle drive set as recited in claim 1, wherein said rear pinion gear is supported by at least one pair of roller bearings.

7. A tandem axle drive set as recited in claim 6 wherein said roller bearings comprise tapered roller bearings.

8. A tandem axle drive set as recited in claim 1 wherein said hollow pinion gear, said through shaft, and said rear pinion gear rotate in a first direction, said first direction based on the rotation direction of said inter-axle differential.

9. A tandem axle drive set as recited in claim 1 wherein said forward drive assembly further includes a forward axle driven by said main differential, said through shaft passing adjacent said forward axle and extending beyond said forward axle toward said rear drive assembly.

10. A tandem axle drive set comprising:

a forward drive assembly including an inter-axle differential having a pair of outer side gears, and a main differential having a forward pinion gear for supplying an input drive from said inter-axle differential to a pair of side gears;

a through shaft having a first end secured to one of said side gears and extending past said forward drive assembly, said through shaft rotating with said at least one outer side gear;

a rear drive assembly including a rear pinion gear and a rear differential, said through shaft driving said rear pinion gear;

rotation of said inter-axle differential rotating said through shaft, said main differential, said rear pinion gear, and said rear differential; and said inter-axle differential, said through shaft, said forward pinion gear, and said rear pinion gear being coaxial.

* * * * *